W. A. SCHLEICHER.
FIFTH WHEEL CLIP ATTACHMENT.
APPLICATION FILED DEC. 13, 1907.
908,334.
Patented Dec. 29, 1908.
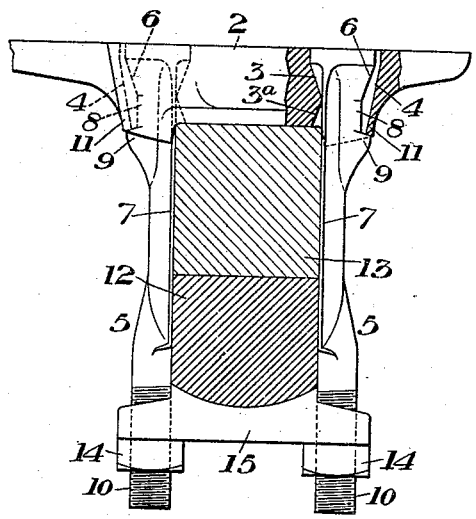
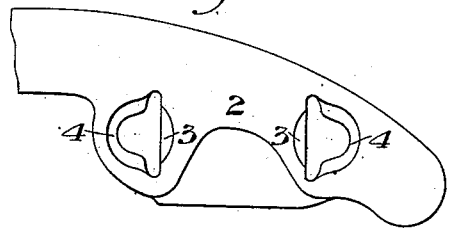
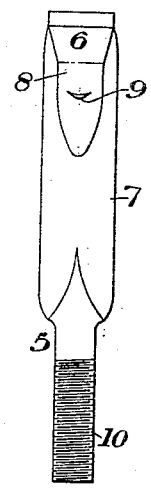
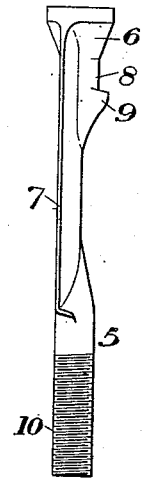
WITNESSES
INVENTOR
William A. Schleicher

UNITED STATES PATENT OFFICE.

WILLIAM A. SCHLEICHER, OF CLEVELAND, OHIO.

FIFTH-WHEEL CLIP ATTACHMENT.

No. 908,334.     Specification of Letters Patent.     Patented Dec. 29, 1908.

Application filed December 13, 1907. Serial No. 406,281.

*To all whom it may concern:*

Be it known that I, WILLIAM A. SCHLEICHER, of Cleveland, Cuyahoga county, Ohio, have invented a new and useful Fifth-Wheel Clip Attachment, of which the following is a full, clear, and exact description, reference being had to the accompanying drawings, forming part of this specification, in which—

Figure 1 is a vertical section of a vehicle axle showing a portion of the lower circle or friction plate of the fifth wheel with my improved clip-securing means; Fig. 2 is a top plan view of a portion of the circle plate; Figs. 3 and 4 are detail views of one of the clips.

My invention relates particularly to the means for securing the lower friction plate or circle of the fifth wheel to the axle; though it may be used for securing other plates to the axle.

The object of the invention is to provide a simple, cheap and effective securing device which will be sightly and neat in appearance.

In wrought iron fifth wheels the clips are usually forged integral with the lower friction plate. This form is expensive, awkward to pack for shipment, and is liable to damage in transit. In malleable iron fifth wheels it is not practicable to form the clips integral with the circle, and different clip attachments have been devised which are objectionable in one feature or another.

In carrying out my invention, I provide holes extending down through the lower circle plate, and preferably enlarge the plate laterally for this purpose, as shown at 2 in Fig. 2. The holes are preferably inclined inwardly slightly, and are provided with chamfered or conical faces 3 and 4 in their upper portions. The inner face 3ª of the hole is preferably flat in its lower portion below the inclined face, while the outer contour of the hole may be of any desired shape, preferably with a single notch for a purpose hereinafter specified.

The clip device consists of two separate legs 5, each of which has preferably a conical head 6 which fits neatly in the upper portion of the circle plate hole, the shank 7 being preferably flat on the inside and having on its outer side a downward extension 8 of the head with a laterally projecting shoulder 9. The lower part 10 of each clip leg is preferably made cylindrical, and is threaded in the ordinary manner.

In applying the device, the clips are inserted with their lower ends pointing inwardly toward the center line of the axle. As soon as the clip leg drops to place with its head flush with or slightly below the top face of the circle plate, the shoulder 9 will have dropped beneath the lower edge of the wall 11 of the circle plate. This wall is at the lower outer edge of the hole for the clip, and when the axle 12 and axle stock or bed 13 are in place, the shoulder is forced outwardly and caused to engage with the circle plate to prevent rising of the clip. The lower part of the circle plate contiguous to the clip holes is suitably formed to provide shoulders bearing against the clip leg shoulders. This gives an unusual strength and solidity to the fastening, and prevents the clip heads from rising above the plane of the lower circle in case the nuts 14 at the lower ends of the clip, and engaging the clip tie 15, should be loosened. Where this rising of the clip legs occurs it may catch on the points of the upper circle and break the entire fifth wheel.

The advantages of my invention result from the strength and solidity of the fastening, and particularly from the use of the co-acting shoulders, which prevent rising of the clip legs. The formation of the clip allows it to be made straight or flat on the side nearest the axle from the seat of the circle to the shank on which the thread is cut. The clip is thus enabled to closely fit the axle bed or stock, and the axle, giving a handsome finish. The necks of the shoulders 8 are intended to give stiffness to the clip where it is driven into the holes, holding them in an upright position while the various parts of the fifth wheel are assembled and the lower circle attached to the axle and axle bed. The clip legs practically form two jaws which prevent any torsional movement of the axle on its own center.

Many changes may be made in the form and arrangement of the fifth wheel, the circle plates, the clip legs, &c., without departing from my invention.

I claim:—

1. The combination with a vehicle axle, of a plate set on the axle and having a vertical hole therethrough at each side of the axle, and bolts or clips inserted downwardly through said holes and secured at their lower ends, said bolts or clips and the plate having means arranged to be brought into interengagement by lateral movement of the bolts or clips to prevent upward movement of the latter, and means for permitting such movement of the bolts or clips; substantially as described.

2. A circle or friction plate having apertures therethrough, and bolts or clips arranged to be inserted downwardly through said apertures, said plate having shoulders at the lower end of the apertures, and the bolts or clips having co-acting shoulders at their outer sides and capable of lateral movement in said apertures sufficient to cause the co-engagement of said shoulders when the parts are in place; substantially as described.

3. In a fifth wheel attachment, a lower circle plate having holes with widened or wedge-shaped upper walls, and clips having correspondingly shaped heads arranged to be dropped into said holes, said clips having outer laterally projecting shoulders engaging the plate to prevent rising of said clips, substantially as described.

4. A lower circle plate having vertically extending holes therethrough with inclined or wedge-shaped upper wall portions, and clips arranged to be dropped into the holes and having correspondingly shaped heads and flat inner shank faces, said clips having outer shoulders arranged to be engaged with the circle plate to prevent the rising of the clips; substantially as described.

In testimony whereof, I have hereunto set my hand.

WILLIAM A. SCHLEICHER.

Witnesses:
  GEO. B. SHEPARD,
  JOHN MCGRATH.